United States Patent Office 3,134,772
Patented May 26, 1964

3,134,772
METHOD OF SYNTHESIS OF BUFALIN
Heisaburo Kondo, 27 Kinno-cho, Shibuyaku, and Setsuro Ohno, 155 3-chome, Koenji, Suginamiku, both of Tokyo, Japan
No Drawing. Filed Apr. 24, 1962, Ser. No. 189,677
Claims priority, application Japan May 1, 1961
3 Claims. (Cl. 260—239.57)

Our invention relates to a method of synthesizing bufalin. More particularly, this invention is concerned with a method of synthesis of bufalin which comprises opening the ring at the epoxide bond of resibufogenin and recovering the bufalin by an alumina chromatographic operation.

We have already discovered that bufalin, which was obtained by isolating either from *Bufo gargarizans china* (toad venom) or from the parotid secretory poison of Japanese toad according to the method described in Japanese Patent No. 253,824, has a remarkable local anesthetic effect which is about 90 times stronger than that of cocaine-HCl (see Table 1), and possesses a characteristic persistency.

TABLE 1
*Potency in Terms of Cocaine-HCl(=1.0) Surface Anesthesia in Rabbit Cornea*

| Substance | No. of animals | Potency of surface anesthesia | | | |
|---|---|---|---|---|---|
| | | $R_1$ | $R_2$ | $R_3$ | Mean |
| Cocaine-HCl | 8 | 1.0 | 1.0 | 1.0 | 1.0 |
| Procaine-HCl | 6 | 0.13 | 0.11 | 0.09 | 0.11 |
| Bufalin | 6 | 78.7 | 87.9 | 98.0 | 88.2 |

$R_1$ Response—10 level.
$R_2$ Response—20 level.
$R_3$ Response—30 level.

It has had to be prepared by a number of complicated operations such as by using active alumina or silica gel as an adsorbing layer and by using repeated chromatography operations with a mixed solvent, and with a very minor amount in the yield of desired compound (as little as 0.2 to 0.4%) thus making the method less valuable and no longer economical.

We have now invented a new method of synthesis of bufalin from material easily available in relatively abundant supply.

The starting material for use in this invention is resibufogenin which has a similar chemical structure as bufalin and is obtainable in a relatively large amount (12%) from *Bufo gargarizans china* or from the parotid secretory poison of Japanese toad.

According to this invention, resibufogenin is subjected to a ring opening reaction at the epoxide bond. This procedure is carried out by reduction of resibufogenin with $LiAlH_4$ and/or $LiAlH[OC(CH_3)_3]_3$.

Chemical structures of "bufalin" and "resibufogenin" are as following:

Bufalin

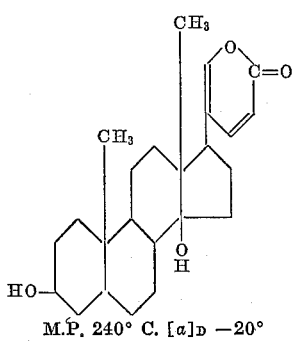

M.P. 240° C. $[\alpha]_D$ —20°

Resibufogenin

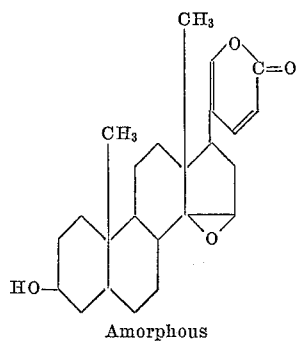

Amorphous

As is noted in the structural formulas, the object of this invention can be obtained by opening the β-epoxide ring of the position at $C_{14}$–$C_{15}$ in the sterol nuclei.

A variety of methods have been invented and reported for opening the epoxide ring. Among these reductive opening is frequently employed. Misao Nakajima has successfully opened the α-epoxide at the position $C_5$–$C_6$ by using metallic sodium and amyl alcohol (Journal of Japan Chemical Society, vol. 64, p. 1369, 1943), and also by catalytic hydrogenation with platinum oxide catalyst in glacial acetic acid (Journal of Japan Chemical Society, vol. 64, p. 1486, 1943). Other reducing agents heretofore employed for opening the epoxide ring are $LiBH_4$ in anhydrous ether and $NaBH_4$ in alcohol.

Kuno Meyer has reported reductive opening of marinobufagenin in acetic acid and methanol (Helvetica Chimica Acta, vol. 42, p. 1397, 1959) and he has also obtained only a very small amount of bufalin by the reductive opening of resibufogenin with $NaBH_4$ and $LiBH_4$.

However, the reductive actions of $NaBH_4$ and $LiBH_4$ are so weak that they are not sufficient agents for the completion of the opening reaction although they have the advantage of minimizing undesirable side reactions.

We have extensively investigated reductive opening of the epoxide ring by means of $LiAlH_4$ and $$LiAlH[OC(CH_3)_3]_3$$

under the observation of pH of the reaction medium for the purpose of preserving the unsaturated lactone ring at the 17-position of the desired compound and which is unstable both in alkaline solution and upon catalytic hydrogenation.

As a reaction medium, ether and tetrahydrofuran are desirable for $LiAlH[OC(CH_3)_3]_3$; alternatively, ether, tetrahydrofuran and dioxane are preferably used with $LiAlH_4$. In each case, however, these solvents should always be absolutely free from water.

Even if $LiAlH_4$ is used, the change of pH in the reaction medium is not critical for carrying out the method of this invention, as is also true for $LiAlH[OC(CH_3)_3]_3$; however, the temperature during the reaction should be maintained as low as possible so as to avoid attack on the carbonyl group by the reducing agent, because the reducing agent is reactive with a carbonyl group.

Accordingly, in the case of $LiAlH_4$, the reaction temperature should be set as low as —40° to —50° C. in absolute ether, etc., as is also true for $$LiAlH[OC(CH_3)_3]_3$$

The resultant product may be separated out from the reaction liquid in accordance with the method described in Japanese Patent No. 253,824. We made an identification of bufalin, before the separation, by monodimensional paper-chromatographic method.

The filter paper used was Whatman Filter Paper No. 51, and stationary phase used was propylene glycol-water solution of the composition 4:1, and the mobile phase was composed of benzene and chloroform 1:1, the colouring reagent developed was a solution of $SbCl_3$ in chloroform.

| Reactants | 0.04 | 0.11 | 0.40-0.50 | 0.75-0.80 |
|---|---|---|---|---|
| | | | | |
| Comparison with authentic compound | Reddish purple | Purple | Purple | Greenish blue |
| | | | | |

Unknown compounds which give spots at Rf=0.04 and 0.11 were detected besides a fairly large amount of unreacted material. Such compounds have not yet been analyzed completely, however, they are considered to be the byproduct resulting from the reaction between the side chain components and the reducing agent.

As shown in following examples, we stopped the reaction at a certain condition, to avoid the reaction from proceeding too far, i.e. the reaction was terminated at the point where the resibufogenin used as raw material disappears.

The following examples illustrate the invention:

EXAMPLE 1

Into a solution of 100 mg. resibufogenin in 20 cc. tetrahydrofuran, was added dropwise another solution containing 300 mg. $LiAlH[OC(CH_3)_3]_3$ in 6 cc. anhydrous tetrahydrofuran with stirring. The reaction mixture was cooled with acetone and Dry Ice to $-20°$ to $-30°$ C. and kept at $-20°$ C. for two hours after the dropping was completed. Into this solution was added either methanol or water to decompose the excess amount of reducing agent. The resultant mixture was then extracted twice with, each time, 100 cc. of benzene with shaking, then washed with dilute alkaline solution, dilute acetic acid and with water respectively. This benzene solution was finally dried with anhydrous sodium sulfate and then subjected to alumina fractionation chromatography to give bufalin at a yield of 62 mg. with a recovery of 22 mg. of starting material.

The analysis of bufalin obtained was:

M.P.=238-240° C. $[\alpha]_D = -20°$ M—OH M=CH$_3$

Analytical value.—$C_{24}H_{34}O_4$: Theoretical V. C, 74.6; H, 8.8. Experimental V. C, 74.35; H, 8.47. The acetate thereof showed:

M.P.=230-239° C. $[\alpha]_D = -6°$

Analytical value.—$C_{26}H_{36}O_5$: Theoretical V. C, 72.46; H, 7.92. Experimental V. C, 71.98, H, 7.80.

U.V. spectrum thereof had a maximum absorbing point at 295 m$\mu$ demonstrating the presence of unsaturated enol lactone ring in the side chain.

There was observed no depression of melting point when mixed with authentic sample.

EXAMPLE 2

Into a solution containing 106 mg. resibufogenin and 20 cc. anhydrous ethyl ether, was added dropwise a solution of 274 mg. $LiAlH_4$ in 20 cc. anhydrous ethyl ether with stirring and while cooling to $-40°$ C. to $-50°$ C. After the resultant mixture stood over four hours, water was added to decompose the excess amount of reducing agent. Then the ether layer was removed from the mixture and washed successively with sodium bicarbonate solution, dilute acetic acid then with distilled water. The solution obtained was dried with anhydrous sodium sulfate, freed from ether by distillation, then treated in the manner described in Example 1 to give 71 mg. of bufalin, the desired product, and 14 mg. of the original material.

We claim:

1. A method of synthesizing bufalin which comprises opening the 14,15-epoxide ring of resibufogenin by subjecting the latter to the reductive action of $$LiAlH[OC(CH_3)_3]_3$$

as reducing agent, in anhydrous organic solvent at a temperature between $-20°$ C. and $-50°$ C.

2. A method of synthesizing bufalin which comprises opening the 14,15-epoxide ring of resibufogenin by subjecting the latter to the reductive action of $$LiAlH[OC(CH_3)_3]_3$$

as reducing agent, in anhydrous tetrahydrofurane at a temperature between $-20°$ and $-50°$ C.

3. A method of synthesizing bufalin which comprises opening the 14,15-epoxide ring of resibufogenin by subjecting the latter to the reductive action of $$LiAlH[OC(CH_3)_3]_3$$

as reducing agent, in anhydrous ethyl ether at a temperature between $-20°$ C. and $-50°$ C.

References Cited in the file of this patent

UNITED STATES PATENTS 2,599,481     Plattner _____ June 3, 1952